(No Model.) 7 Sheets—Sheet 1.

J. W. BURTON.
COIN CONTROLLED PHOTOGRAPHIC APPARATUS.

No. 516,076. Patented Mar. 6, 1894.

—WITNESSES—
Dan'l Fisher
George Hemsley

—INVENTOR—
James W. Burton (No Model.) 7 Sheets—Sheet 3.

J. W. BURTON.
COIN CONTROLLED PHOTOGRAPHIC APPARATUS.

No. 516,076. Patented Mar. 6, 1894.

WITNESSES
Dan'l Fisher
George Hemsley

INVENTOR
James W. Burton
by Geo. W. T. Howard
atty.

(No Model.)

J. W. BURTON.
COIN CONTROLLED PHOTOGRAPHIC APPARATUS.

No. 516,076.  Patented Mar. 6, 1894.

WITNESSES
Dan'l Fisher
George Hemsley

INVENTOR
James W. Burton,
by W. T. Howard,
attys.

(No Model.)  7 Sheets—Sheet 6.

J. W. BURTON.
COIN CONTROLLED PHOTOGRAPHIC APPARATUS.

No. 516,076. Patented Mar. 6, 1894.

WITNESSES
Dan'l Fisher
George Hemsley

INVENTOR
James W. Burton
by W. T. Howard
Atty.

(No Model.)

J. W. BURTON.
COIN CONTROLLED PHOTOGRAPHIC APPARATUS.

No. 516,076. Patented Mar. 6, 1894.

UNITED STATES PATENT OFFICE.

JAMES W. BURTON, OF CLEVELAND, OHIO.

COIN-CONTROLLED PHOTOGRAPHIC APPARATUS.

SPECIFICATION forming part of Letters Patent No. 516,076, dated March 6, 1894.

Application filed April 19, 1893. Serial No. 470,975. (No model.)

*To all whom it may concern:*

Be it known that I, JAMES W. BURTON, of the city of Cleveland, in the county of Cuyahoga and State of Ohio, have invented certain Improvements in Coin-Controlled Photographic Apparatus, of which the following is a specification.

In the description of the said invention which follows, reference is made to the accompanying drawings forming a part hereof, and in which—

Figure 1:
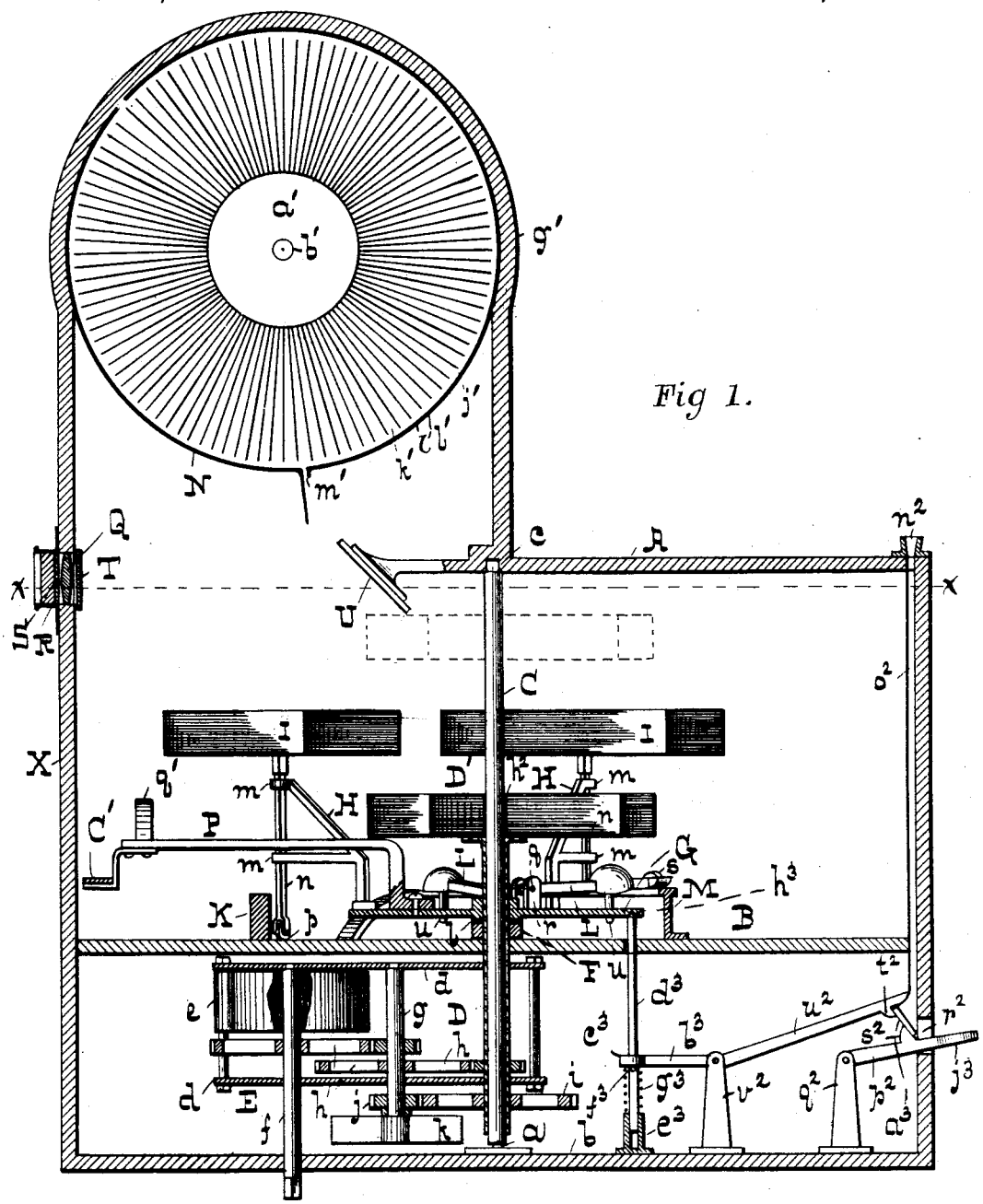
Figure 2:
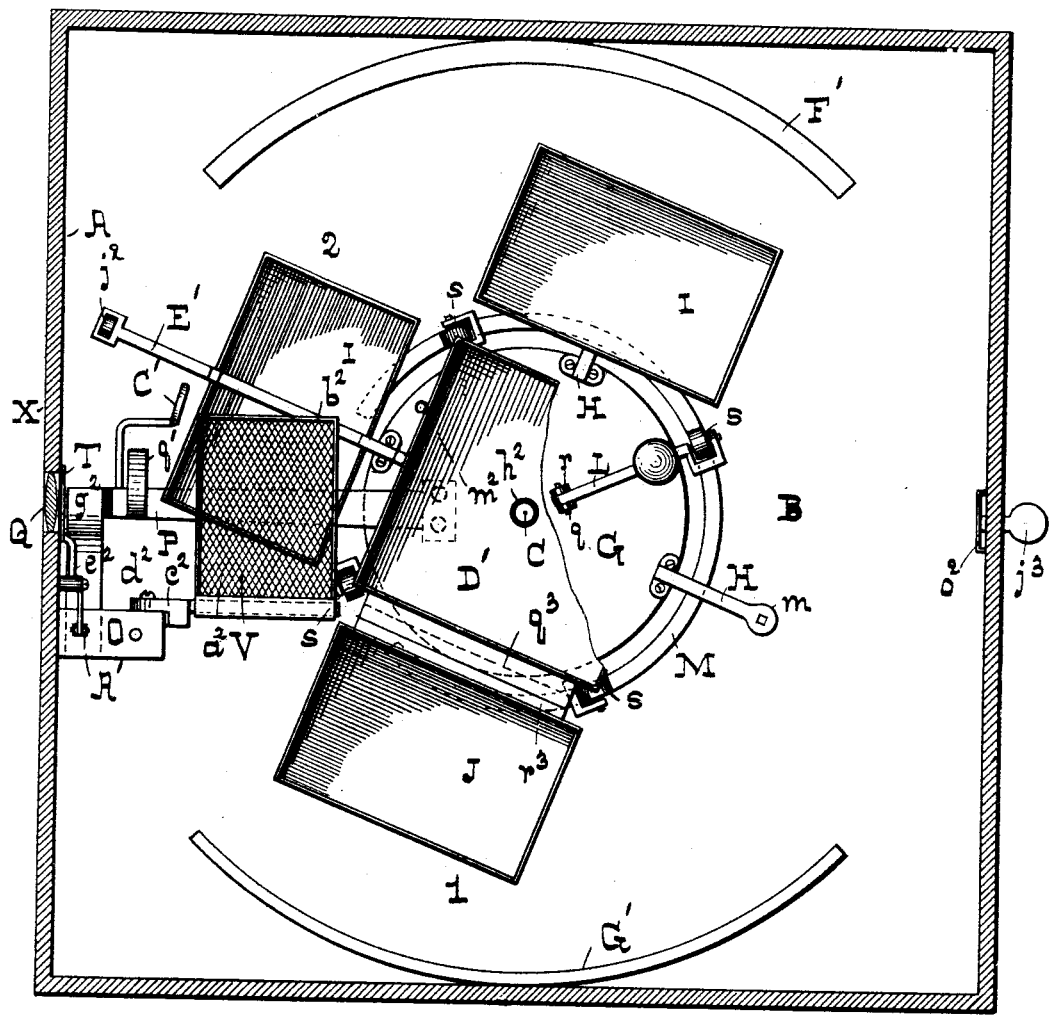
Figure 3:
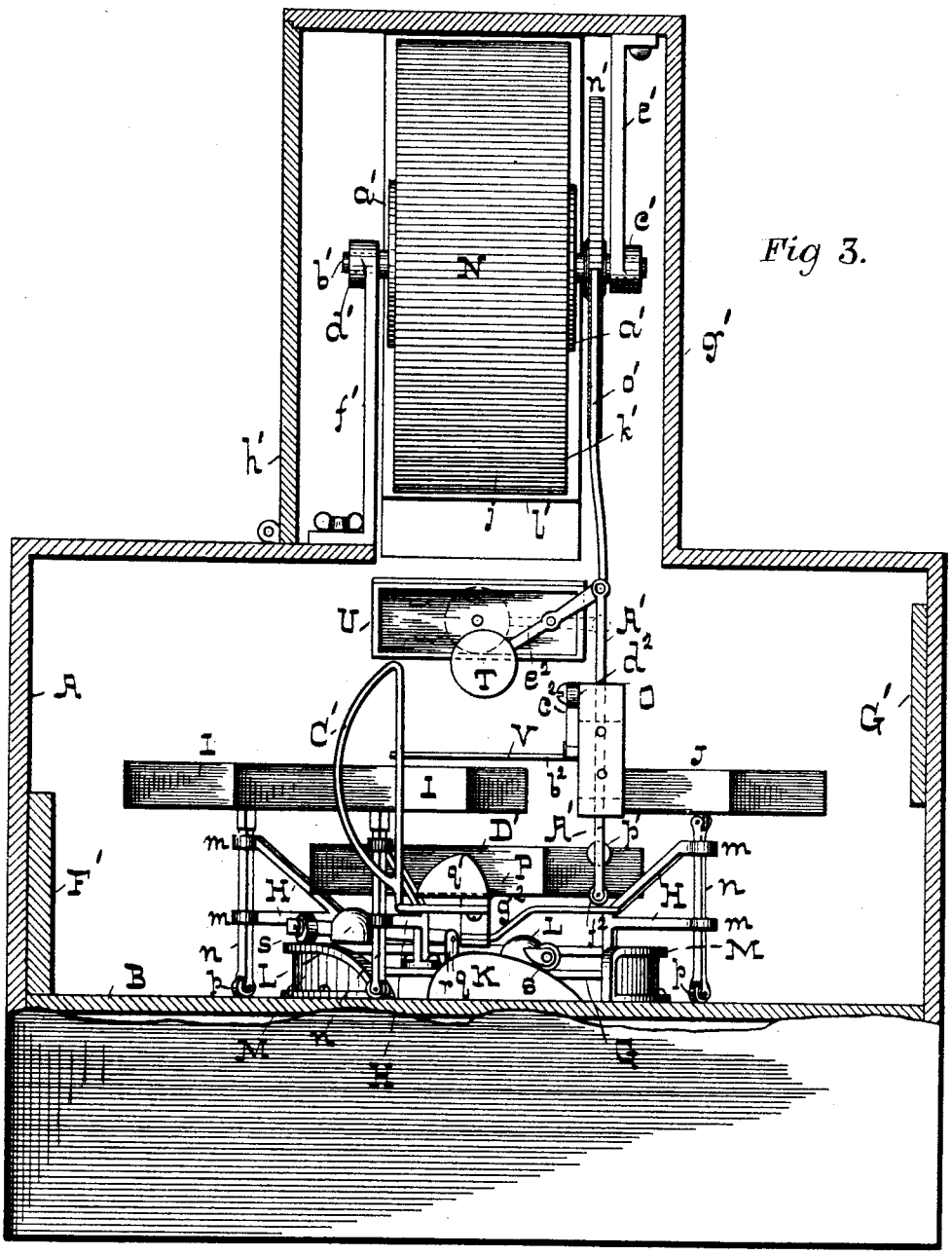
Figure 4:
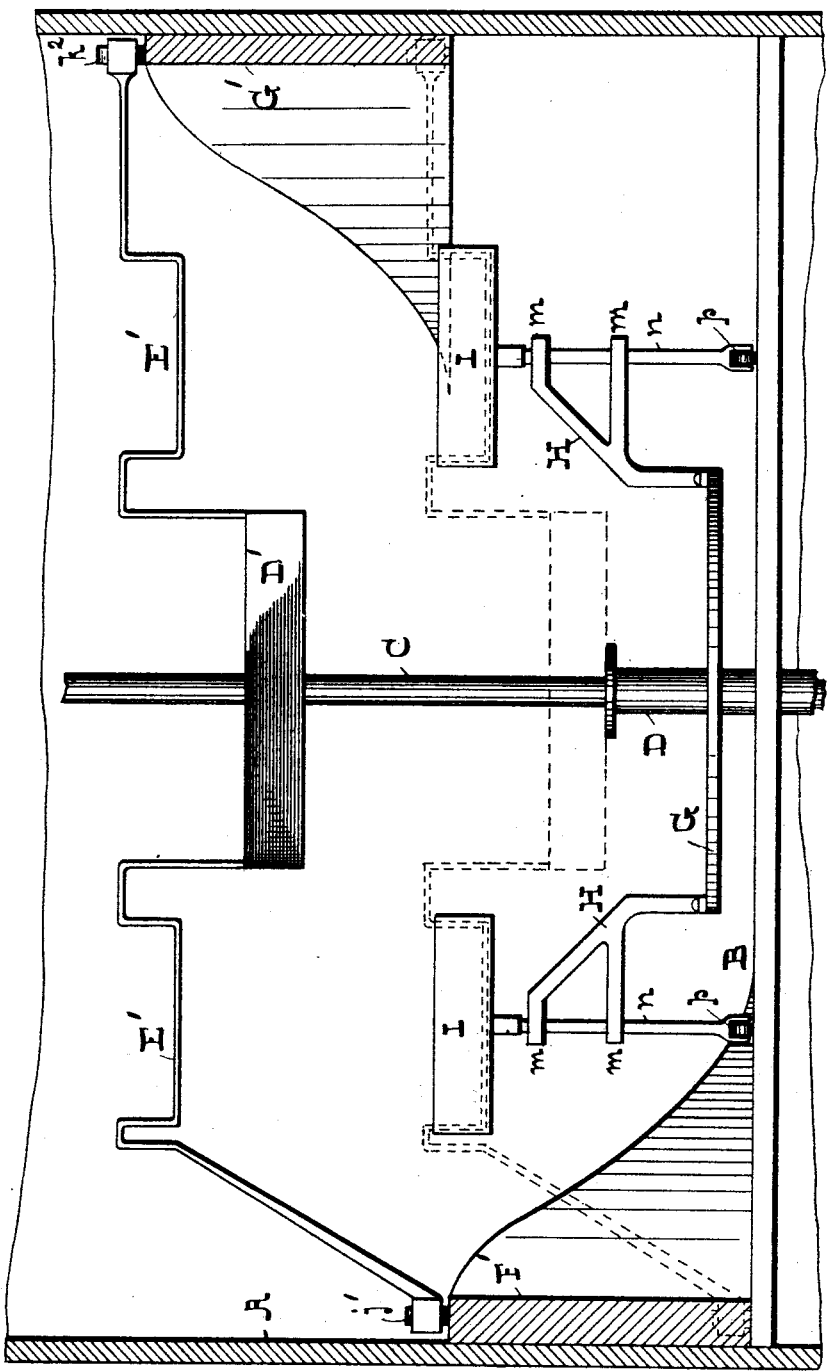

Figure 1 is a central vertical section of the improved apparatus. Fig. 2 is a transverse section of Fig. 1 taken on the dotted lines $x$—
$x$. Fig. 3 is a front view with a portion of the box removed. Figs. 4 to 8, inclusive, are details of the apparatus on an enlarged scale.

Referring to the drawings, A is the box or casing of the apparatus, and B a false bottom therein.

C is a central shaft stepped on a pin $a$ on the true bottom $b$, and supported at the upper end in a hole $c$ in the top of the box.

D is a sleeve adapted to turn loosely about the shaft C.

E is an ordinary clock movement placed under the false bottom B and adapted, under certain circumstances hereinafter described, to revolve the sleeve D. This clock movement consists of the frame $d$ spiral spring $e$, shafts $f$ and $g$, and a train of gearing denoted as a whole by $h$. A gear $i$ on the sleeve D is in mesh with a pinion $j$ placed loosely on the shaft $g$, and to this pinion is secured the governing fan or fly $k$ which regulates the speed of the clock movement.

F is an arm secured to the sleeve D at a point immediately above the false bottom B. In Fig. 1 the hub only of the arm is shown, and in Fig. 6 the arm is illustrated in dotted lines.

Figure 5:
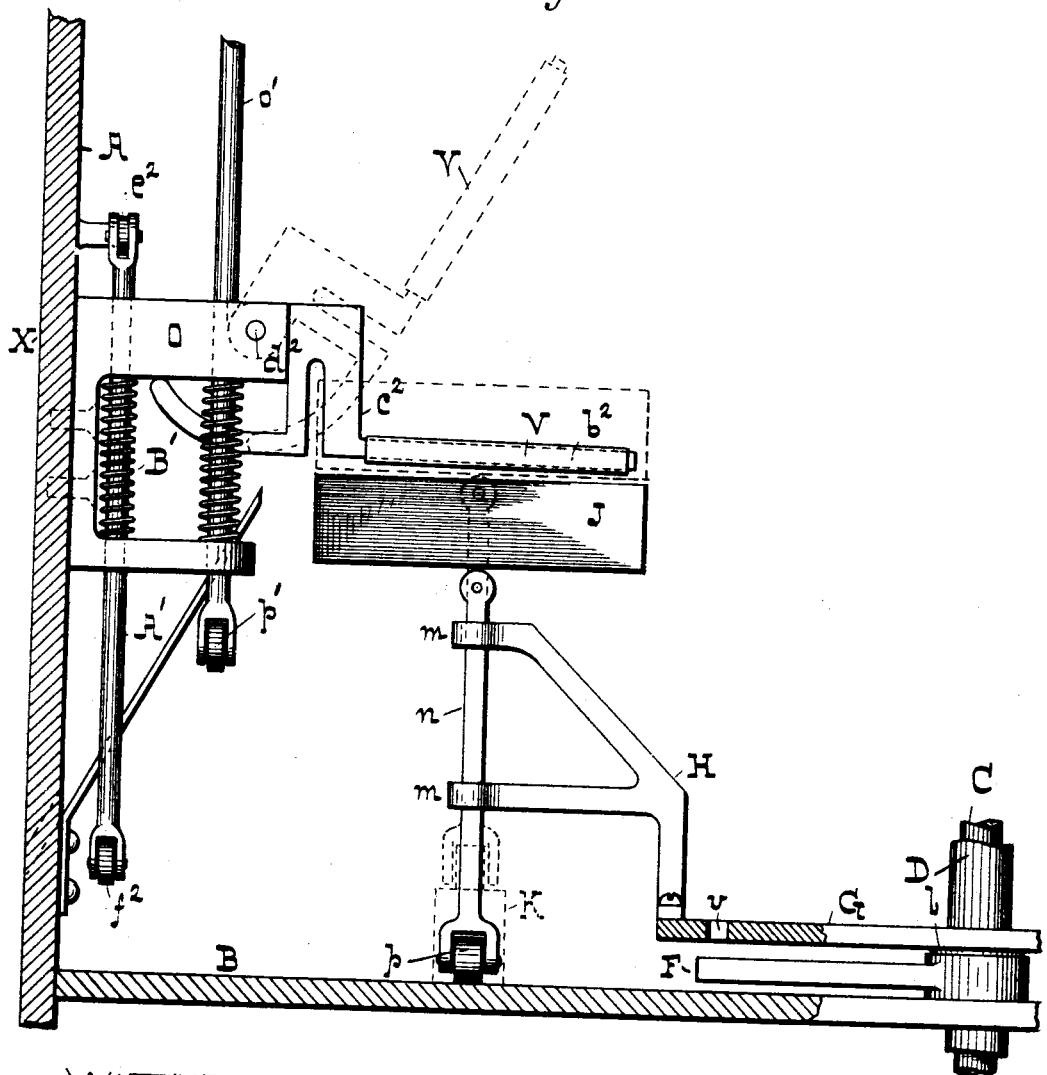
Figure 6:
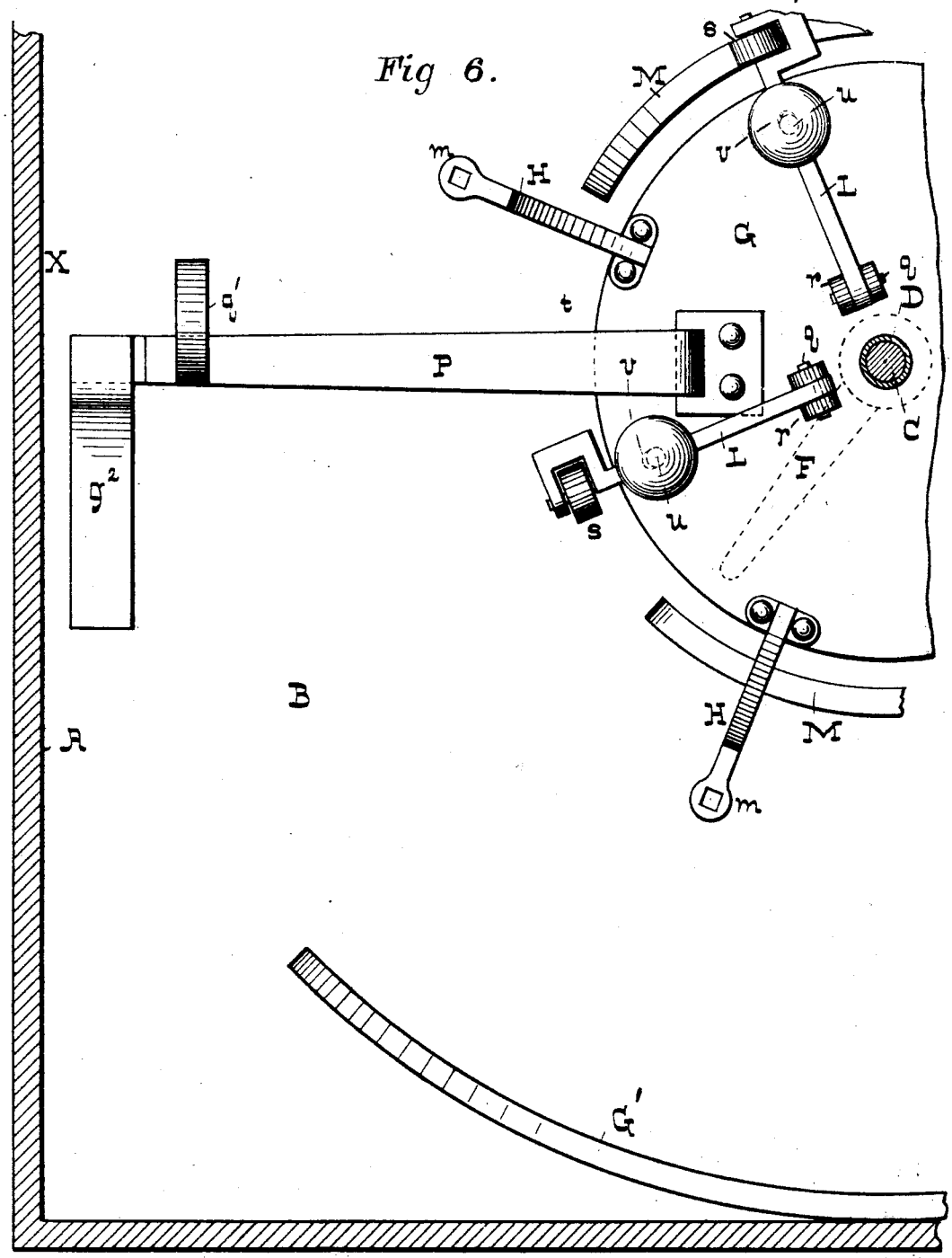
Figure 8:
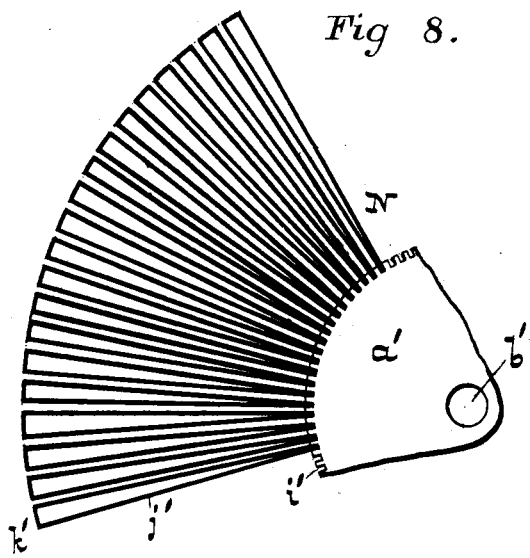

G is a circular table placed loosely on the sleeve D and resting on an anti-friction washer $l$ on the hub of the arm F, see particularly Figs. 1 and 5.

H H are brackets bolted to the upper side of the table G and placed at a common distance apart. These brackets project beyond the circumference of the table G and project considerably above it, and they each have two bearing lugs $m$ in which rest square stems $n$.

I and J are shallow pans supported by the stems $n$, and the pans I are fixed as regards their stems, while the one J is hinged to its stem to admit of its being tilted under circumstances hereinafter set forth. The tilting pan J is well shown in Fig. 7 wherein it is illustrated as tilted by the full lines and in a horizontal position by the dotted lines. All the square stems $n$ carrying the pans I and J are adapted to have a vertical reciprocating movement within the bearing lugs of the brackets H, and each one is provided with a roller $p$ at its lower end adapted to roll over a segmental curved block K seated on the false bottom B. The object of the curved block which is in the path of the roller $p$ of the stem $n$ as the table G is rotated, is to lift the pans I and J as they reach a certain position hereinafter described.

L L are weighted arms hinged at $q$ to lugs $r$ on the table G and placed at equal distances apart. At the end of each arm L is a roller $s$, see particularly Fig. 6, adapted to ride on a mutilated circular raised track M fastened in any suitable manner to the top of the false bottom B. By reference to the drawings it will be seen that the space $t$ between the ends of the mutilated track M and which occupies about one-fourth of the circumference of the track, is toward the front side X of the box A. To the under side of each arm L is secured a pin $u$ of such length that when the arm L is in the space $t$ between the ends of the track M, the said pin projects through a hole $v$ in the table, and comes nearly in contact with the false bottom B. But when the arms L are so placed that their rollers $s$ rest on the track M these pins $u$ are lifted. When the arms L are down, their pins $u$ are directly in the way of the arm F, and when elevated the said arm F can be revolved without coming into contact with the said pins.

N is a drum for holding the sensitized plates on which the pictures are to be produced. This drum consists of a hub $a'$ having a spindle $b'$ adapted to turn in bearing boxes $c'$ and $d'$ formed on brackets $e'$ and $f'$ extending respectively from the top of the extensions $g'$ of the box A, and the top of the box proper. The latter bracket $f'$ and the side $h'$ of the box extension $g'$ are removable to admit of the change of drums. The circumference of the hub $a'$ of the drum N is notched, and into each notch $i'$ is forced a folded piece of cardboard $j'$ which has the effect of producing a series of pockets $k'$ in each one of which is placed a sensitized plate not shown. By folding the pieces of cardboard into the shape of wedges as shown, in Fig. 8, the pockets $k'$ are made of uniform width from the hub out. Around this drum as described, is placed a sheet metal cylindrical casing $l'$ open at the side next the bracket $f'$, see Figs. 1 and 3. A slot $m'$ in the under side of the cylindrical casing $l'$ allows of the discharge of the lowest sensitized plate. Secured to the spindle $b'$ of the drum N is a ratchet wheel $n'$, and against the teeth of this wheel is held in any suitable manner, a spring supported pawl $o'$ the lower end of which is formed into a rod and supported by the bracket O attached to the front X of the box A. At the lower end of the rod $o'$ is a roller $p'$ whereby the rod is raised once during each revolution of the table G through the medium of an arm P bolted to the table and carrying a curved projection $q'$, see Figs. 1, 2, 3 and 6.

Q is the lens placed in the front X of the box A and protected by a glass plate R, and between the lens and the protection glass, is a perforated diaphragm S. Behind the lens and within the box, is a shutter T which during a certain portion of the operation of the apparatus, falls and discloses the lens as will hereinafter appear.

U is a reflector placed at an angle of forty-five degrees with a vertical line and directly opposite the lens Q, and, it is also in such position as to reflect the image on a sensitized plate resting on a plate holder V. This plate holder is formed of a piece of wire cloth $a^2$ expanded on a frame $b^2$ secured to an arm $c^2$ fulcrumed at $d^2$ to the bracket O, see particularly Fig. 5. The normal position of the plate holder V is horizontal, but by means of devices hereinafter described, it may be raised to an angular position to discharge the finished plate to an opening leading to the exterior of the box see Fig. 5.

The mechanism whereby the shutter T is opened and closed consists of a rod A' sustained in the bracket O and held yieldingly down by a spiral spring B'. The upper end of this rod is hinged to the shutter lever $e^2$ see Fig. 3, and at its lower end has a roller $f^2$ adapted to run over a short piece of elevating track $g^2$ on the end of the arm P.

The device whereby the plate holder V is tilted consists of a curved bar C' projecting upward on the arm P. In the revolution of the table G this curved bar strikes the under side of the hinged arm $c^2$ of the plate holder and raises it to the position shown in dotted lines in Fig. 5.

D' is a fifth pan having a central sleeve $h^2$ whereby it is adapted to be slid vertically on the shaft C. A feather $i^2$ on the shaft C serves to communicate circumferential motion to the pan. The pan D' is raised once for a short time during each revolution of the table G by means of the bars E' which project laterally from the said pan. These bars have rollers $j'$ and $k^2$ at their ends, and the roller $k^2$ is considerably higher than the other $j'$ in order to adapt them for two curved tracks F' and G' of different heights, secured one on the false bottom B, and the other to the side of the box A. These devices are well shown in Fig. 4. The pan D' and the shaft C are revolved with the table G by means of a bar $m^2$ which projects upward from the table and strikes the side of the pan as shown in Fig. 2.

Figure 7:
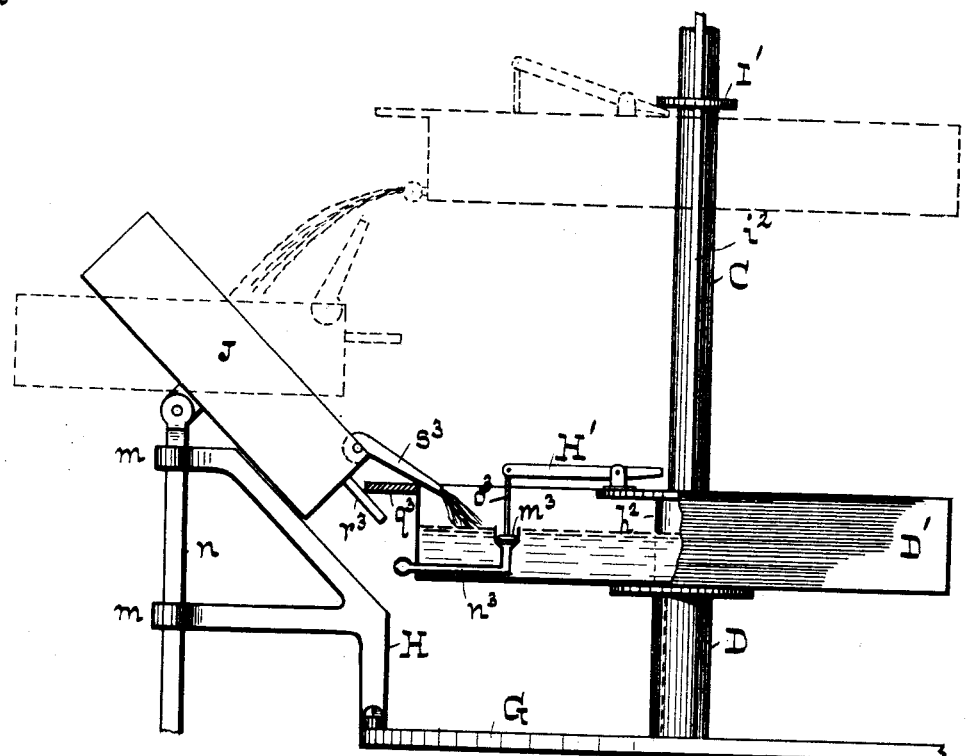

It is intended when the clock movement is wound, to set the apparatus in operation by means of a coin dropped into a slot, and to this end, the box A has a slotted mouth piece $n^2$ with a channel $o^2$ leading therefrom to below the false bottom. Directly under the channel $o^2$ is a lever $p^2$ fulcrumed to a stand $q^2$ and extending through a hole $r^2$ in the rear side of the box A. On this lever is a lug $s^2$ which co-operates with a lug $t^2$ on a second lever $u^2$ fulcrumed to a stand $v^2$ to hold the coin $a^3$ which coin forms the connection between the two levers. The short arm $b^3$ of the lever $u^2$ has an eye $c^3$ through which extends a stem $d^3$. The lower part of this stem rests in a socket $e^3$, and between a pin $f^3$ and the upper end of the socket $e^3$ is a spiral spring $g^3$ which serves to yieldingly hold the stem $d^3$ in its highest position. The upper end of the stem $d^3$ passes through the false bottom B and presses against the under side of the table G. The table has one hole $h^3$ into which the end of the stem $d^3$ enters at each revolution of the table and stops it and also the clock movement. Now, by lifting the projecting end $j^3$ of the lever $p^2$, the stem $d^3$ is depressed and its end withdrawn from the hole $h^3$. Upon releasing the end of the lever $p^2$ the stem being still depressed the coin falls to the bottom of the box from which it may be withdrawn by first opening a suitable locked door not shown. Supposing that the clock movement is wound, and the various parts of the apparatus to be in the relative positions shown in Figs. 1, 2 and 3, and it is desired to take a portrait, the person to be photographed stands in front of the lens and then drops a coin in the slotted mouth piece $n^2$. He then lifts the lever $p^2$ by means of the projecting end $j^3$. This places the machine in operation as before described. The first action in the operation consists in a vertical movement of the spring supported rod $o'$ which operating on the ratchet wheel $n'$ turns the drum N the distance of one ratchet tooth and allows one sensitized plate to fall on the plate holder V. Almost immediately the shutter T is opened and the image reflected by the mirror U to the sensitized plate. During this time the arm F has started on its revolution and coming in contact with the pin $u$ of one of the weighted arms L which is down or depressed owing to its being in the space $t$ between the ends of the track M, causes the table to move in unison with it. This conjoint action continues until the weighted arm strikes the inclined end of the track M when it begins to rise. As soon as the weighted arm has reached its full height its pin is lifted from contact with the arm F and the table stops while the arm F continues on. The movement described effects a quarter revolution of the table G, and during that quarter turn, the pan J containing the developing liquid, passes from the position 1 to the position 2, Fig. 2, and in this change in position rises to its full height and then falls. But it reaches its greatest height as it comes directly under the plate holder on which is seated the sensitized plate, and the holder and plate are immersed and held under the developing liquid for a few moments. While the pan J is being transferred from the position 1 to position 2, the storage pan D' for developing liquid, is being elevated and upon its reaching its highest point, a valve $m^3$ in a discharge pipe $n^3$ is opened by means of a lever H', the short arm of which strikes a collar I' on the shaft C. The long arm of this lever is connected to the valve $m^3$ by a link $o^3$. The liquid from the storage pan is now poured out into the partially filled pan J, and thus prevents rapid exhaustion of the strength of the liquid. The arm F now begins its second revolution and carries the table another quarter of a complete rotation in a manner similar to that before described. This carries the developing liquid pan which has been lowered from the developed plate, and substitutes for it the next pan which contains water. By this time the storage pan D' has been lowered, and in its descent its flange $q^3$ strikes a similar flange $r^3$ on the developing pan J and that pan is tilted as shown in Fig. 7, and a portion of its contents are discharged through a hinged spout $s^3$ to the storage pan D'. During the next quarter revolution of the table, the developed plate is subjected to a fixing liquid in the third pan and at the fourth quarter revolution washed with water, when the plate is dumped by the elevation of the plate holder as before described. From the foregoing description it will be seen that in one complete operation of the machine, the sleeve D carrying the arm F makes four complete revolutions, and the table and its attachments one; and that the operation of the machine after the dumping of the developed plate, is finally stopped by the entrance of the upper end of the stem $d^3$ into the hole $h^3$ in the under side of the table.

I claim as my invention—

1. In a coin controlled photographic apparatus, a dumping plate holder combined with a series of developing and washing pans arranged on a revoluble table and adapted to be lifted so as to immerse the said plate seated on the said holder, substantially as specified.

2. In a coin controlled photographic apparatus, the combination of a revoluble drum having pockets for holding and isolating sensitized plates, a casing for the drum having an opening whereby the plates may be discharged, a plate holder situated under the said drum, a series of developing and washing pans adapted to be revolved under the said plate holder, mechanism whereby each pan as it reaches the said plate holder is elevated so as to immerse the plate and holder, and mechanism to tilt the said plate holder and discharge the said plate substantially as specified.

3. In a coin controlled photographic apparatus, the combination of a receptacle for sensitized plates and devices whereby the same are discharged separately, a plate holder, a series of developing and washing pans the members of which are successively brought under and raised so as to immerse the plate and actuating mechanism and devices whereby the introduction of a coin sets the actuating mechanism in motion, substantially as specified.

4. In a coin controlled photographic apparatus, the combination of pans adapted to rotate about a common center, mechanism for intermittingly raising and lowering them, for the purpose described, a storage pan for the developing liquid adapted to supply the rotating one, and means whereby after the supplying of the said liquid the rotating pan is tilted and a portion of its contents poured back to the storage pan, substantially as specified.

JAMES W. BURTON.

Witnesses:
R. MOTT,
C. A. THOMAS.